United States Patent Office 3,707,530
Patented Dec. 26, 1972

3,707,530
METHOD FOR PRODUCING POLYMERS OF ETHYLENE
Benedetto Calcagno, Milan, Paolo Colombo, Saronno, and Giovanni Livraghi, Milan, Italy, assignors to Società Italiana Resine S.p.A., Milan, Italy
No Drawing. Filed Nov. 19, 1969, Ser. No. 878,201
Claims priority, application Italy, Nov. 23, 1968, 24,086A/68
Int. Cl. C08f *1/42, 3/06*
U.S. Cl. 260—94.9 E                     1 Claim

ABSTRACT OF THE DISCLOSURE

A process for the preparation of ethylene polymers which comprises contacting at temperatures between 50° and 80° C. and a pressure ranging from below atmospheric pressure up to five atmospheres, gaseous ethylene with a catalytic solution of a member selected from the group consisting of a saturated aliphatic hydrocarbon solvent, a cyclo-aliphatic hydrocarbon solvent, and an aromatic hydrocarbon solvent, and a three-component system selected from the group consisting of:
  (a) a member selected from the group consisting of vanadium oxychloride and vanadium oxyacetyl acetonate;
  (b) titanium tetrachloride; and
  (c) a member selected from the group consisting of an aluminum dialkylchloride of the formula $AlR_2Cl$, an aluminum alkyl dichloride of the formula $AlRCl_2$, and an alkyl aluminum sesquichloride of the formula $Al_2R_3Cl_3$;
wherein R represents an alkyl radical having from 1 to 10 carbon atoms, said atomic ratio between said vanadium and said titanium ranging between 0.075 and 0.3, said atomic ratio between said aluminum and said vanadium ranging between 4 and 15, and said catalytic solutions being prepared by:
  (1) contacting in said hydrocarbon solvent, catalysts (a) and (b) with 20–80% by weight of the overall three-component catalytic system of catalyst (c), at a temperature of from $-20°$ to $+20°$ C.,
  (2) ripening said solution during a period of from 1–25 hours and at a temperature of from $-20°$ to $+20°$ C., and
  (3) adding, after the ripening period, the remaining quantity of catalyst (c) at a temperature of from 50–120° C.

BACKGROUND OF THE INVENTION (1) Field of the invention

The present invention relates to a method of producing polymers of ethylene and co-polymers of ethylene and alpha olefines.

The invention concerns likewise the preparation of catalysts suitable for the production of those polymers and co-polymers.

(2) Description of the prior art

For the polymerisation of olefines, in the present state of the art, various catalysts are used, and in particular those commonly known as "Ziegler catalysts" involve the combination of at least one compound of the metallic transition elements with a metallic, organo-metallic or metallo-hydride derivative belonging to metals in Groups Ib, IIb and IIIb of the periodic system.

The polymerising reactions in which such catalysts are used are carried out in the absence or, more usually, in the presence of inert solvents, or else the gaseous olefine is fed to the catalyst while this is supported on a solid consisting of that polymer which is being formed.

The employment of such catalysts often presents various chemical and technical problems, not easy to solve, in the process of olefine polymerisation.

Thus, for example, in the technique normally applied, whereby polymerisation takes place in the presence of an inert solvent, there may be difficulties due to incrustation of the reaction vessel and pipes.

Moreover, the polymer suspensions in the solvent attain high levels of viscosity, even when the polymer concentration is low.

This brings with it the difficulty of agitating the suspensions in the reaction vessel, as well as feed troubles in the polymerisation plant. It is also necessary to use large quantities of solvent, which has to be recovered from the olefine polymer and purified prior to re-cycling.

It has now been discovered that the drawbacks inherent in the present state of the art, as regards the preparation of ethylene polymers and of ethylene and alpha olefine co-polymers, can be eliminated from or reduced in processes in which the polymerisation is carried out in the presence of an inert solvent.

SUMMARY OF THE PRESENT INVENTION

One object of the present invention is therefore the prevention of the formation of highly viscous suspensions during the polymerisation of olefines, and of ethylene in particular, in the presence of inert solvents.

Another aim of the invention is to obtain suspensions having a high olefine polymer content, sufficiently fluid to be readily agitated and fed in the said polymerising processes.

A further object of the invention is a method of polymerising olefines, and ethylene in particular, in the presence of an inert solvent, whereby it is possible to achieve substantially the complete elimination of incrustation in the equipment used for the purpose.

These aims and objects can be achieved by polymerising the olefines under controlled conditions in the presence of a particular class of catalysts prepared by the specific methods described hereunder.

More particularly, the catalysts here proposed form a system of three components selected respectively from the three classes referred to below:

Class 1: This class includes compounds of elements in Group Va of the periodic system, especially halides, oxyhalides, alcoholates, acetyl acetonates and other complexes in which the metal is in the condition of maximum valency or has a lower valency. Of these compounds, the chlorides, oxychlorides, acetyl acetonates and alcoholates of vanadium and niobium are to be particularly preferred.

Class 2: This class includes compounds of elements in Group IVa of the periodic system, especially halides, alcoholates and acetyl acetonates, in which the metals have their maximum valency. Of these compounds, the tetrahalides and alcoholates of titanium and zirconium are to be particularly preferred.

Class 3: This class includes organo-metallic compounds of metals belonging to Groups IIb and IIIb of the periodic table of elements. Particularly suitable for the purpose are organo-metallic compounds of the RmMeXn type, in which Me represents zinc or aluminium, R is an alkyl radical containing from 1 to 10 carbon atoms, X represents a halogen and $m+n$ represents the valency of Me. Of these compounds, the alkyl chlorides and sesquichlorides of aluminium are to be preferred.

The composition of the catalysts with which the present invention is concerned is such that the atomic ratio between the Group Va metal and the Group IVa metal is between 0.01:1 and 20:1, while the atomic ratio between the Group Va metal and the Group IIb metal is between 1:1 and 1:20.

The method of preparing the catalysts here proposed consists essentially in bringing together in an initial stage the compounds of the metals in Groups IVa and Va and a fraction of a metallo-organic compound, the metal belonging to Group IIb or IIIb of the periodic system, and in adding, in a second stage, the remainder of that metallo-organic compound, a suitable maturing period being allowed between the two stages, which are carried out in the presence of a solvent under controlled temperature conditions.

DETAILED DESCRIPTION OF THE INVENTION

More particularly, in the preparation of these catalysts, the compounds of elements belonging to Groups IVa and Va of the periodic system are dissolved in an organic solvent of saturated aliphatic hydrocarbons, cyclo-aliphatic hydrocarbons or aromatic hydrocarbons.

The temperature of the solution is then regulated to between −50° C. and +50° C. and preferably between −20° C. and +20° C., and the organo-metallic compound of a metal belonging to Group IIb or IIIb of the periodic system is added, to the extent of 20 to 80% by weight related to the total amount present in the finished catalyst.

The solution is maintained within the said range of temperature for a period of not less than one hour and not more than 25 hours, the preferred time being between one hour and 3 hours.

The solution is then brought to a temperature of 50° C. to 120° C., preferably to that of the subsequent polymerisation, whereupon the remainder of the metallo-organic compound used in the initial stage is added.

It may sometimes be desirable to mature the catalytic solution in the presence of suitable quantities of olefines, and ethylene in particular, the conditions in which the catalyst is prepared being in other respects as already described.

The resultant catalytic solution is directly used in the olefine polymerisation process. The total concentration of catalytic salts in the solution of catalyst is from 1 to 10 grammes per litre, while that of the compounds of Group Va elements lies between 0.01 and 1.0 grammes per litre. The catalyst may be prepared by a continuous or a discontinuous process, but in any case it is necessary to shield the reactions from light, to ensure the absence of moisture and to work in an atmosphere of inert gas.

The catalysts concerned in the present invention are suitable for the preparation of ethylene polymers.

It is also possible to prepare olefine co-polymers such as, for example, co-polymers of ethylene and propylene or ethylene and butene-1. For the preparation of ethylene polymers in particular, the ethylene gas is brought into contact with the catalytic solutions already mentioned at temperatures of 50° C. to 80° C. and at pressures from sub-atmospheric to 5 atmospheres.

When polymerisation is carried out in the conditions stated, the suspensions obtained contain from 30 to 40 parts by weight of polymer to every 100 parts by volume of solvent. Such suspensions are fluid enough to be readily agitated in the polymerising container and fed to the equipment even through small-diameter pipes.

This procedure also results in the substantially complete elimination of those polymer deposits in the equipment which give rise to crust formation.

The present method has the further advantage of using only small amounts of solvent for polymerisation, in addition to which, since the catalyst is dissolved in the solvent, it can be recovered in large quantities by simple filtration and washing of the polymer.

This also facilitates the subsequent purification of the polymer, to eliminate the residual catalyst present.

It should be noted that it is possible, by the use of the catalysts here proposed, to obtain olefine polymers having desirable properties.

In particular, one can obtain products with different fusion indices by varying the atomic ratios between the Group IIb or IIIb metal and the Group Va metal or between the Group Va metal and the Group IVa metal.

Table 1 shows the fusion index values of ethylene polymers obtained experimentally by varying those ratios.

In the table, R1 indicates the atomic ratios in the catalyst between the Group Va metal and the Group IVa metal, while R2 indicates the ratios between the Group IIIb metal and the Group Va metal.

TABLE 1

| R1 | 0.3 | 0.2 | 0.1 | 0.075 |
|---|---|---|---|---|
| R2 | | | | |
| 4 | 1.15 | 3.70 | 1.60 | 0.20 |
| 6 | 2.18 | 4.18 | 1.79 | 0.42 |
| 9 | 3.20 | 5.57 | 6.20 | 3.17 |
| 12 | 0.37 | 1.67 | 6.48 | 6.06 |
| 15 | 0.10 | 0.50 | 5.20 | 4.20 |

It should be mentioned that, except in the case of compounds belonging to the first of the classes described, one can also obtain catalyst solutions which make it possible, in the polymerisation or co-polymerisation of ethylene, to obtain fluid suspensions even when the polymer concentration is high, provided the catalyst solutions be prepared in the manner already described.

In that case, however, one loses the advantages regarding the regulation of the polymer characteristics, with the result that the polymerising procedure becomes less flexible after all.

The use of the catalysts concerned in this invention results in high-yield polymerisation, 100 to 200 or more grammes of polymer being produced per gramme of catalytic salt.

In particular, the polymers separate out from the reaction products in the form of powder having a grain-size distribution of from 10 to 500$\mu$, according to experimental conditions.

The following experimental examples will serve to illustrate the invention further.

A better understanding of the present invention will be gained from the following examples, which are merely intended to be illustrative and not limitative of the present invention.

EXAMPLE 1

A 250 cc. dark glass flask fitted with an agitator and a thermometer was charged with 100 cc. of a paraffin fraction containing 7 carbon atoms and having a boiling range of 92° C.–97° C., 0.275 cc. of VOCl$_3$ and 3.175 cc. of TiCl$_4$, in a nitrogen atmosphere. After thermostat regulation to 5° C., 1.64 cc. of Al$_2$Et$_3$Cl$_3$ was added with the agitator running and the said temperature was maintained for 75 minutes. At the end of that time, 20 cc. of the resultant solution was put into a 1,000 cc. flask fitted with an agitator and a thermometer, containing 480 cc. of the paraffin fraction already referred to, in addition to 0.33 cc. of Al$_2$Et$_3$Cl$_3$, the temperature being maintained at 70° C.

After one minute, ethylene gas was introduced into the flask and polymerisation proceeded during the next 5 hours under the following conditions: temperature 70° C.; pressure 20 mm. Hg above atmospheric.

The absorption of ethylene remained constant throughout the experiment; and upon completion of polymerisation, after decomposition of the catalyst with alcohol, 130 grammes of polyethylene was recovered, the characteristics of this being: melting point 133.5° C.; density 0.955 g./cc.; number of methyl groups per 1,000 carbon atoms 1.0; number of unsaturations per 1,000 carbon atoms 0.6.

EXAMPLE 2

The 250 cc. flask referred to in Example 1 was charged with 100 cc. of benzene, 0.8 g. of VO(C$_5$H$_7$O$_2$)$_2$ and 1.60 cc. of TiCl$_4$. To this, after cooling to 10° C., was added 2.8 cc. of AlEt$_2$Cl, with the agitator running.

After standing for one hour at that temperature, 20 cc. of the resulting solution was removed and put into a 1 litre flask containing 480 cc. of benzene and 0.56 cc. of AlEt$_2$Cl, working at a temperature of 60° C.

The ethylene was then fed into the flask, with the temperature maintained at 60° C. and the pressure 20 mm. Hg above atmospheric.

After 5 hours, there was a yield of 122 grammes of an ethylene polymer having the following characteristics: melting point 133° C.; density 0.952 g./cc.; number of methyl groups per 1,000 carbon atoms 1.5; number of unsaturations per 1,000 carbon atoms 0.8.

EXAMPLE 3

A 24 litre stainless steel reaction vessel, polished inside, was charged continuously with a catalytic solution consisting of VOCl$_3$, TiCl$_4$ and Al$_2$Et$_3$Cl$_3$, in the same proportions and using the same solvent as described in Example 1.

In particular, the VOCl$_3$ and TiCl$_4$ and 60% of the Al$_2$Et$_3$Cl$_3$ were left to stand for one hour at 0° C. Then the remaining 40% of the Al$_2$Et$_3$Cl$_3$ was added, the working temperature being 70° C. The amount of solvent used in this experiment was such as to give a concentration of salts in the catalytic solution one-half of that in Example 1.

Ethylene gas was also fed into the reaction vessel and the reaction products were discharged continuously, the reaction time allowed being approximately 10 hours. The polymerisation was carried out at a temperature of 70° C. and a pressure of 1.80 atmospheres.

With the experiment proceeding steadily, the suspension discharged had a polyethylene content of 35 grammes to every 100 cc. of solvent.

The polymer had the following characteristics: melting point 133° C., density 0.952 g./cc.; number of methyl groups per 1,000 carbon atoms 1.6; number of unsaturations per 1,000 carbon atoms 1.0.

The reaction described was continued for some 1,500 hours, during which time it gave no trouble in the way of incrustation or the like.

The polymer suspension discharged from the reaction vessel was diluted with fresh anhydrous solvent and then filtered and washed. In this way, about 50% of the catalyst employed was recovered.

At the end of the experiment, approximately 70 g. of a substance having a similar molecular weight and coefficient of viscosity to the polymer produced was collected from the walls of the vessel.

EXAMPLE 4

A catalytic solution, consisting of 0.22 cc. of VOCl$_3$, 2.74 cc. of TiCl$_4$ and 3.2 cc. of Al$_2$Et$_3$Cl$_3$ in the solvent referred to in Example 1, was prepared by the procedure described in that example, the only difference being that the aluminium ethyl sesquichloride was added during the first stage of preparation to the extent of 50%, the rest being added in the second stage at 70° C.

Operating at 70° C. and under a total pressure of 5 atmospheres, ethylene and propylene were added separately to the solution of catalyst, in such a way as to maintain within the reaction zone a gas mixture having a composition which was constant and such as was required to produce a copolymer having a propylene content of 6% by weight.

The copolymer obtained had the following characteristics: melting point 127° C.; density 0.939 g./cc.; number of methyl groups per 1,000 carbon atoms 23.0; number of unsaturations per 1,000 carbon atoms 0.1.

Comparative run

The same procedure was followed as in Example 3, except that the whole of the Al$_2$Et$_3$Cl$_3$ was added at 0° C. in the preparation of the catalyst.

After heating to 70° C., the ethylene was polymerised as described in Example 3.

In this way, the suspension discharged from the reaction vessel had a polymer content of 12 grammes to every 100 grammes of solvent. The reaction was halted after it had been in progress for about 75 hours, because of the crust formation.

What we claim is:

1. A process for the preparation of ethylene polymers which comprises contacting at temperatures between 50° and 80° C. and a pressure ranging from below atmospheric pressure up to five atmospheres, gaseous ethylene with a catalytic solution of a member selected from the group consisting of a saturated aliphatic hydrocarbon solvent, a cycloaliphatic hydrocarbon solvent, and an aromatic hydrocarbon solvent, and a three-component system consisting essentially of:
 (a) a member selected from the group consisting of vanadium oxychloride and vanadium oxyacetylacetonate;
 (b) titanium tetrachloride; and
 (c) a member selected from the group consisting of an aluminum dialkylchloride of the formula AlR$_2$Cl, an aluminum alkyl dichloride of the formula AlRCl$_2$, and an alkyl aluminum sesquichloride of the formula Al$_2$R$_3$Cl$_3$;

wherein R represents an alkyl radical having from 1 to 10 carbon atoms, said atomic ratio between said vanadium and said titanium ranging between 0.075 and 0.3, said atomic ratio between said aluminum and said vanadium ranging between 4 and 15, and said catalytic solutions being prepared by:
 (1) contacting in said hydrocarbon solvent, catalysts (a) and (b) with 20–80% by weight of a compound belonging to catalyst (c), at a temperature of from −20° to +20° C.,
 (2) ripening said solution during a period of from 1–25 hours and at a temperature of from −20° to +20° C., and
 (3) adding, after the ripening period, the remaining quantity of catalyst (c) at a temperature of from 50–120° C.

References Cited

UNITED STATES PATENTS 3,058,963 10/1962 Vandenberg _____ 260—94.9
3,218,266 11/1965 Ludlum _____ 260—94.9

FOREIGN PATENTS 886,371 1/1962 Great Britain.
841,638 7/1960 Great Britain.
896,496 5/1962 Great Britain.
1,531,633 5/1968 France.

JAMES A. SEIDLECK, Primary Examiner

E. J. SMITH, Assistant Examiner

U.S. Cl. X.R.

252—429 C; 260—88.2 R